United States Patent [19]

Bailey

[11] Patent Number: 4,485,405
[45] Date of Patent: Nov. 27, 1984

[54] INTEGRATION TIME CONTROL

[75] Inventor: Theodore B. Bailey, Ridgecrest, Calif.

[73] Assignee: The United States of America as represented by the Secretary of the Navy, Washington, D.C.

[21] Appl. No.: 390,143

[22] Filed: Jun. 18, 1982

[51] Int. Cl.³ ............................................. H04N 3/14
[52] U.S. Cl. .................................. 358/213; 358/228; 350/485
[58] Field of Search ....................... 358/225, 228, 213; 350/485, 227

[56] References Cited

U.S. PATENT DOCUMENTS

| | | | |
|---|---|---|---|
| 2,997,922 | 8/1961 | Kaprelian | 354/227 |
| 3,443,098 | 5/1969 | Lewis | 250/199 |
| 3,514,182 | 5/1970 | Banks | 350/160 |
| 3,514,183 | 5/1970 | Rabedeau | 350/160 |
| 3,556,638 | 1/1971 | Banks et al. | 350/161 |
| 3,565,514 | 2/1971 | Bate et al. | 350/285 |
| 3,577,200 | 5/1971 | Aldrich et al. | 178/7.1 |
| 3,758,199 | 9/1973 | Thaxter | 350/285 |
| 3,982,274 | 9/1976 | Chai | 358/41 |
| 4,202,014 | 5/1980 | Gilligan et al. | 358/228 |

Primary Examiner—Howard W. Britton
Assistant Examiner—John K. Peng
Attorney, Agent, or Firm—Robert F. Beers; W. Thom Skeer; Kenneth G. Pritchard

[57] ABSTRACT

This is an apparatus and method for increased dynamic range control of a charge coupled device camera. The dynamic range is improved by use of a frustrated total internal reflection device which limits the amount of light that can reach a CCD array within the camera system. The net effect of the frustrated total internal reflection device is to eliminate photon access to the sensor during the time that smear noise may occur. By appropriate circuit controls, the time of photon contact with the CCD array is controlled and thereby limits saturation of the CCD array.

2 Claims, 17 Drawing Figures

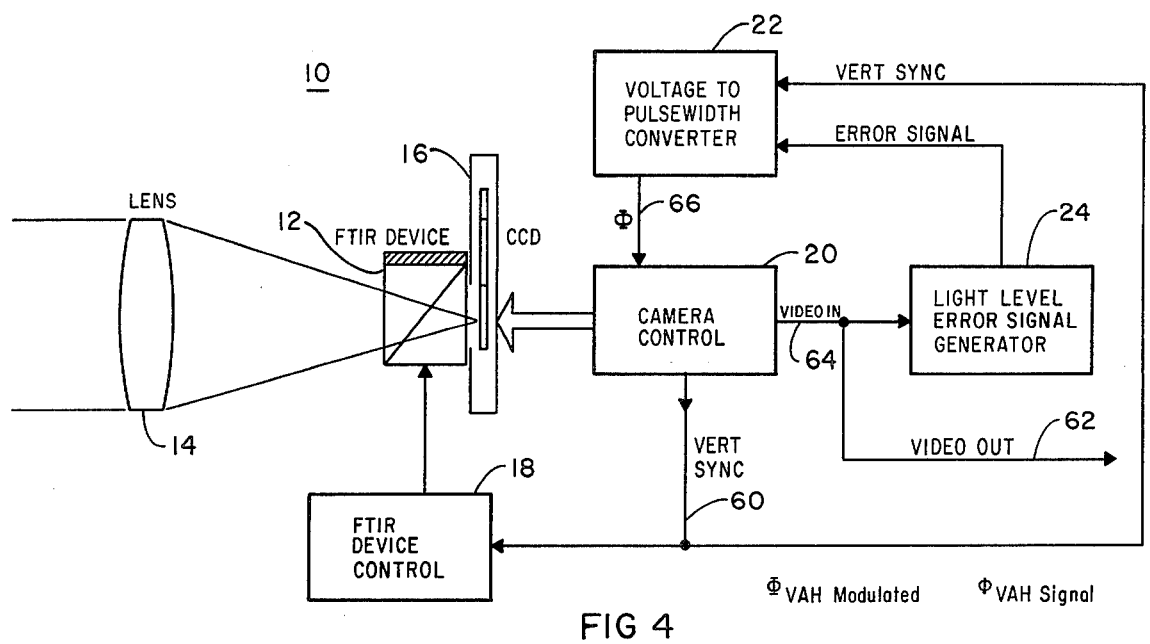
FIG 4
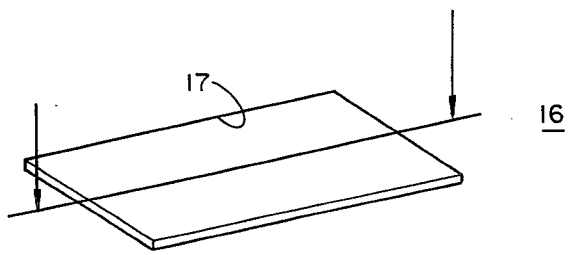
FIG 5(a)
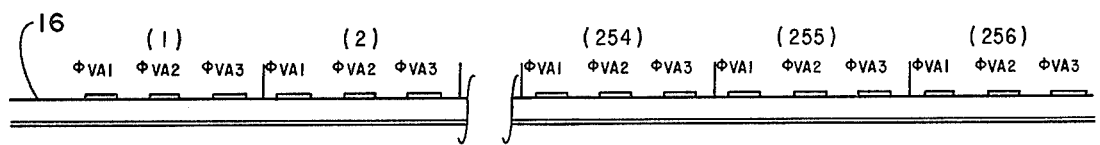
FIG 5(b)
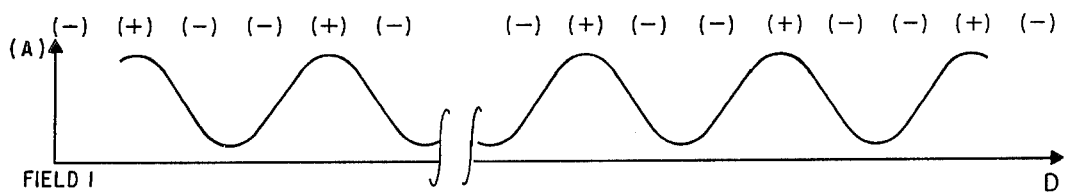
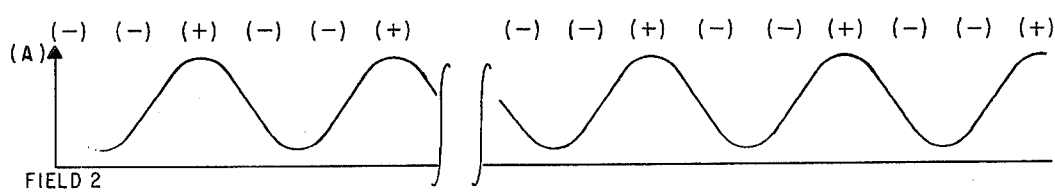
FIG 5(c)

Reflection Mode FTIR Device

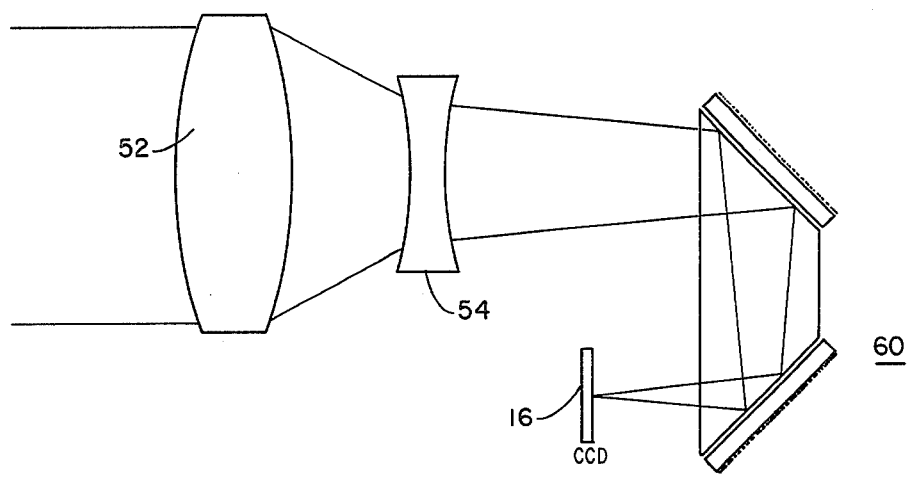
FIG 9(a)
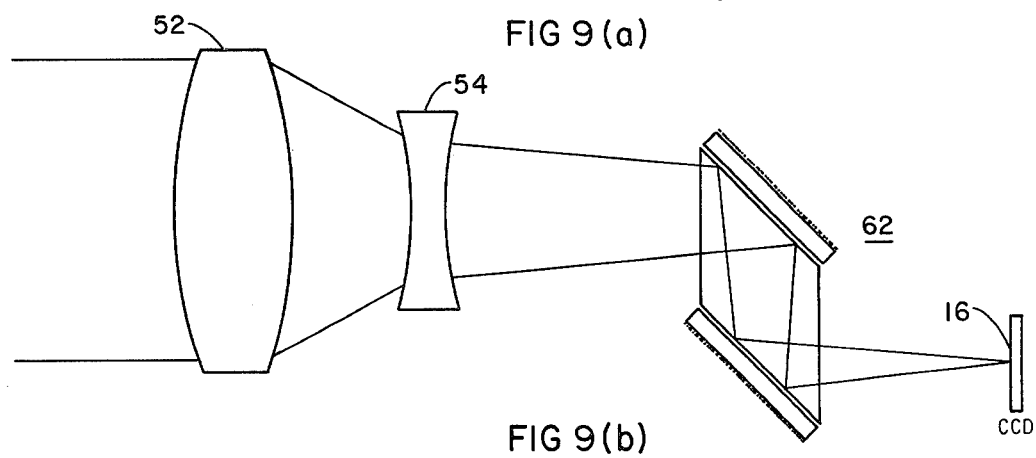
FIG 9(b)
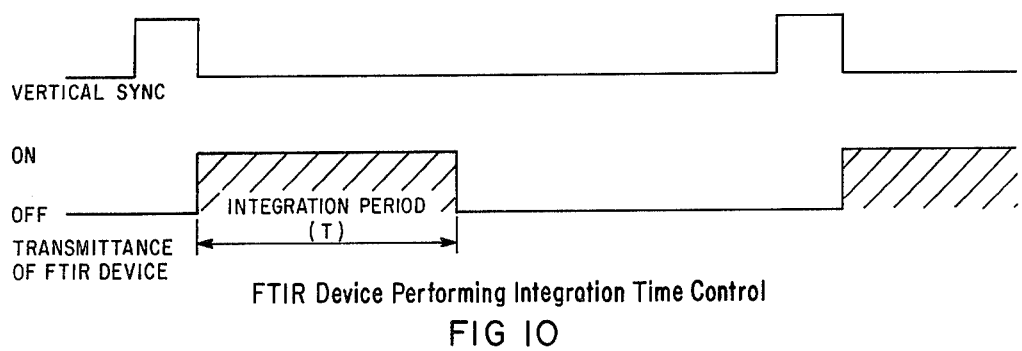
FTIR Device Performing Integration Time Control
FIG 10
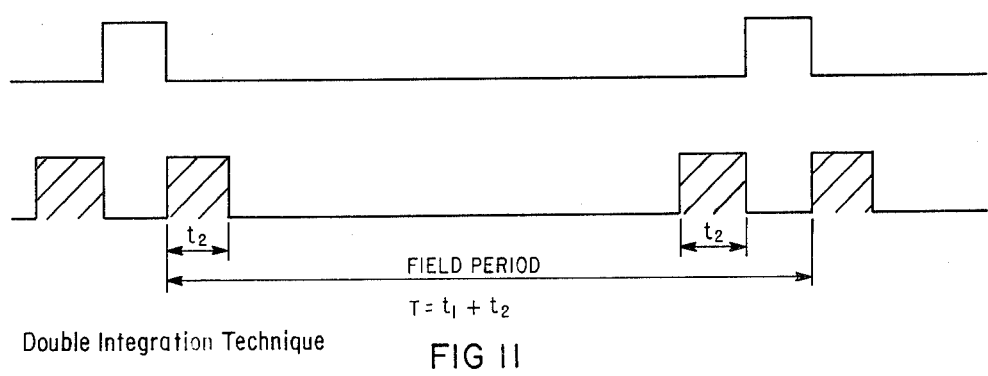
Double Integration Technique    FIG 11

INTEGRATION TIME CONTROL

BACKGROUND OF THE INVENTION

1. Field of the Invention

The present invention relates to sensitivity controls for camera systems. In particular, the present invention relates to sensitivity controls for charge coupled device imagers.

2. Description of the Prior Art

Charge coupled device, CCD, imagers are known to operate over the silicon response spectral band. These devices suffer the deficiency of limited dynamic range. While the devices have ample sensitivity for daylight operation, many CCD imagers suffer from saturation when the scene intensity levels reach the order of 200 times the minimum detectable signal level for surface channel devices. If the system is to operate throughout daylight hours, an overall light intensity range on the order of 5000:1 may be experienced. As a result, charge coupled device camera systems have been required to use a set filter for a specific light level of operation. If a filter is adequate to permit maximum light intensity in daylight operations, the CCD camera loses its sensitivity to low light level conditions. Conversely, low level filters or no filtering of the CCD device for low light level conditions can be defeated by high intensity light levels which overwhelm the camera system in daylight operation.

The sensitivity of a CCD or any other photodetector may be controlled by either of/or a combination of two methods. These methods are (1) control of the rate of integration of photon generated charge; and (2) control of time of integration of photon generated charge in the detector, i.e., exposure control. Since the quantum efficiency of a present day CCD imager cannot be readily altered without image degradation, control of the integration rate of usable photon generated charge must be achieved by means of controlling the quantity of photons reaching the detector. In order to accomplish this, an obstruction in the optical path is required. Considering all CCD seeker system requirements, it becomes clear that a catadioptric optical imaging system should be used which has a central obscuration. A catadioptric system is a combination reflective and refractive optical system. The use of an iris or other methods which obscure the entrance pupil in a non-uniform manner result in image quality degradation. If an obstruction in the optical path is to be used, it must provide uniform optical restriction across the optical aperture, such as a neutral density filter with controllable density. The second approach to sensitivity control, exposure control, is via control of the integration time period of the imager. This in turn may be achieved by either or a combination of two methods: (1) control of the time interval during which photons are allowed to reach the detector; or (2) control of the time period during which photon generated signal charge is allowed to accumulate.

Frustrated total internal reflection devices are known optical techniques. The basic principle relies on the fact that, when light passes from a high index material to a low index material, a portion of the light wave is transmitted and reflected in accordance with Snell's law.

$$\sin \theta' = \frac{n}{n'} \sin \theta \qquad \text{EQ. 1}$$

Snell's law is also described with reference to FIG. 1 which shows the relationship between reflection and refraction at an interface. Light incident along path I strikes the surface at an angle $\theta$ with respect to a normal, N, to the surface. If the index n in the incident path is greater than the index n', the light will be divided into two components T and R as shown. The reflected light comes out along path R, where the angle of incidence is equal to the angle of reflection. The transmitted light, T, is transmitted as angle $\theta'$ with respect to a normal to the surface. When the incident angle exceeds the critical angle, $\theta_c$, $$\theta_c = \sin^{-1}(n'/n) \qquad \text{EQ. 2}$$

all of the light is reflected back into the high index material, that is total internal reflection, TIR. Thus, none of the light would be transmitted along path T. However, even though the energy is totally internally reflected, electro-magnetic fields do penetrate the surface and exist in the lower index material for a very short distance. If a third medium with index of refraction equal to the first, is introduced very close to the first, FIG. 2, the TIR can be frustrated to such a degree that essentially all of the light is transmitted.

With reference to FIG. 2, the amount of light transmitted is a function of the distance, D, between the two high index mediums. If D is much less than a wavelength of the incident light, transmission can be very high. If D is greater than a wavelength, the light will be totally reflected. The relation for the percent of light transmitted is:

$$T_{(\sigma,\pi)} = \frac{1}{1 - \Gamma_{(\sigma,\pi)}} \sinh \Psi \qquad \text{EQ. 3}$$

In this equation $T\sigma$ and $T\pi$ are the transmittance for light polarized parallel and perpendicular, respectively, to the interface.

$$\Gamma \sigma = \left(\frac{n^2 - 1}{2n}\right)^2 / \cos^2\theta (n^2 \sin^2\theta - 1)$$

$$\Gamma \pi = \Gamma \sigma \left[(n + 1)\sin^2\theta - 1\right]^2$$

$$\Psi = \left(\frac{2\pi D}{\lambda}\right) \sqrt{n_1^2 \sin^2\theta - n_o} =$$

$$\left(\frac{D}{\lambda}\right) 2\pi \sqrt{n^2 \sin^2\theta - 1} \quad \text{(for air gap)}$$

$\theta$ is the angle of incidence at the interface
n is the index of refraction of the prisms
$\lambda$ is the wavelength of incident light
D is the gap spacing.

This permits a light switch or variable light valve to be built with a device which is controled by spacing D. FIG. 3 shows a typical response curve for an FTIR prism.

The smear noise of a frame transfer CCD device is the result of a charge generated during the transfer period. It is reduced by eliminating photon access to the sensor during that time period. This is done by introducing an optical switch into the optics train that shuts off light during the transfer period. The requirements for a switch to operate in this mode are a turn off time of 15 to 20 microseconds, a turn on time of 300 to 350 microseconds, a duty cycle of 15.4 milliseconds on, 1.3 milliseconds off, and an on-state transmittance greater than or equal to 80% uniform aperture, an off-state transmittance of 0.01%. It can be seen from these requirements that most mechanical and electro-optical devices are eliminated.

Control of the integration time of a CCD camera permits improvement of the sensitivity control for two reasons. The first approach is to control the $V_{\phi VAH}$ signal to the CCD imager chip. This $V_{\phi VAH}$ signal controls the photon generated charge integration capabilities of the individual imager cells. The problems with this technique are (1) when the $V_{\phi VAH}$ control is switched from low to high during the time that video is being read out by the CCD, a transient is coupled into the video which results in a white line across the image and (2) a significant deficiency in dynamic range is encountered by this technique. When the integration period is lowered to $\frac{1}{8}$ of a normal field period, image smearing occurs and increases as the integration period is shortened. It remains to be seen whether the former of these problems is one of EMI, electro-magnetic interference, and can be eliminated by careful electronic design. The latter problem can be explained as follows; the field transfer technique used by the CCD requires on the order of 0.9 milliseconds to shift the image-generated charge pattern from the image array to the storage and readout array. During the 0.9 millisecond transfer period, photon generated charge is being generated as the charge is clocked from the image array to the storage array. The charge generated during this transfer period may be considered as noise since it doesn't contribute to the image signal. This noise appears as a smeared image. Assuming that the photon intensity is the same during transfer as during image integration, the signal to noise ratio for this type of noise is on the order of 17 to 1 with 16.67 millisecond field integration time. In this case, the charge generated by the signal is much larger than the noise charge generated during transfer. However, as the signal charge integration time is decreased, the signal to noise ratio decreases and the image starts to smear. It has been noticed that at integration times of the order of $\frac{1}{8}$th of the full integration time, the scene started to smear. This corresponds to about 2:1 signal to smear noise ratio.

The net effect of this problem is to impose a limit of approximately 8:1 on the dynamic range. One method to get around this is to increase the field transfer rate. This decreases the transfer period. When this is done, the noise collection time is smaller and hence, the noise signal is less. There are two problems with this approach, first a definite time is required to shift out the image data since the dynamic range may be increased but only to the point that the image integration time approaches the transfer period, and secondly for a surface channel CCD the transfer rate is already at its upper limit and further increases would introduce image degradation.

SUMMARY OF THE INVENTION

A rapid optical attenuator of light on a CCD array is created by use of an FTIR device. The device permits the gap spacing used in an FTIR device to shutter light in a CCD camera. The rapid change in the shuttering is produced by the use of two piezoelectric stacks as actuators between prisms of an FTIR device. This construction incorporates the FTIR device in the optical train. The smear noise resulting from charge generated during transfer period of a CCD device is reduced by eliminating the photon access to the sensor during that time. The FTIR serves as an optical switch in the optics train that shuts off light during the transfer period.

Accordingly it is an object of the invention to design a CCD camera system with a significant reduction in smear noise. A further object of the invention is to incorporate an FTIR device into a CCD camera system to allow a large increase in the dynamic range of a CCD camera system.

BRIEF DESCRIPTION OF THE DRAWINGS

FIG. 4 is a block diagram of the present invention;

FIGS. 5A, 5B, and 5C show the photon generated charge integration capabilities during the two fields of a CCD array;

FIGS. 9A and 9B are side views of alternate versions of reflection mode FTIR devices;

FIG. 10 is a graph of an FTIR device integration time control;

FIG. 11 is a graph of a double integration time control technique;

DESCRIPTION OF THE PREFERRED EMBODIMENT

Figure 1:
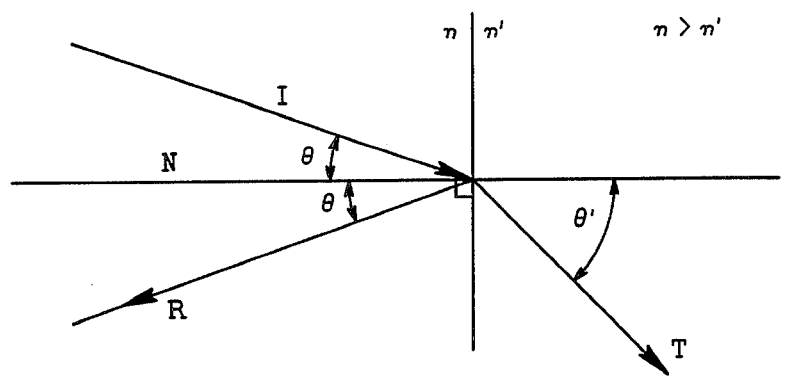
FIG. 1 is a ray diagram of the transmittance-reflectance characteristics of Snell's Law at an interface.

The present invention incorporates a frustrated total internal reflection, FTIR, device in the optical train. This is shown in FIG. 4.

FIG. 4 shows the sensitivity control system. The entire CCD camera system is referred to generally by 10. The FTIR device 12 is placed between a lens 14 and a CCD focal plane array 16. FTIR device 12 has the operation and function to simply blank the light input during the transfer time period. FTIR device 12 has a fixed frequency, pulse width and duty cycle which is synchronized to the vertical synchronization signal from camera control 20 by FTIR device control 18. The bulk of the integration time control is then done by control of the $\phi VA$ signal by a voltage to pulse width converter 22. Converter 22 matches the vertical synchronization signal to an error signal from an error signal generator 24. When $\phi VA$ is low ($\phi VAL$), which means slightly negative with respect to the substrate, the photon generated charge in a given cell is forced into recombination and therefore is not integrated. Converter 22 sends a camera clocking signal $\Phi 66$ to camera control 20.

Figure 6:
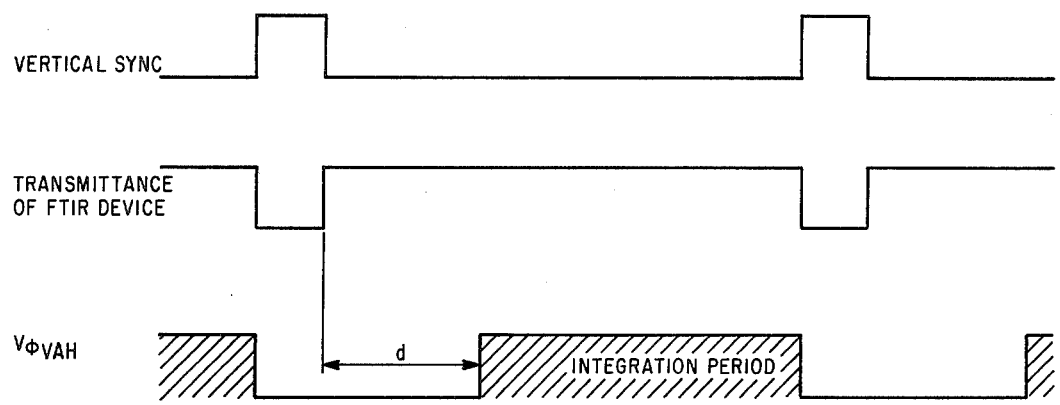
FIG. 6 shows integration time control waveforms.

FIGS. 5A and 5B show a cross-section of CCD 16 imaging area. For the cut shown in FIG. 5A, a single pixel is shown which has a storage area and an image area. Pixel 17 is one of a two dimensional array of pixels 17 which record an image at a given time. FIG. 5B shows one column of an array. The image is then transferred out of the individual pixels by row through a bucket brigade technique. Each pixel has three separate polysilicon electrodes across it which are connected in parallel to each pixel. These electrodes are shown in FIG. 5B as $\phi_{VA1}$, $\phi_{VA2}$, and $\phi_{VA3}$. If A represents the ability of a differential embodiment CCD array 16 to integrate photon generated charge, and d represents distance in the vertical direction along the chip, the curves in FIG. 5C show how the charge collecting areas are controlled during the two fields of a TV frame. FIG. 5C also shows how the interlace is accomplished. When the electrodes are held low, charge in that region of the cell are forced into the substrate and recombination. When the electrodes are high, photon generated charge is allowed to collect. If V$\phi_{VAH}$, the signal of system $\phi$VA high levels, is modulated as shown in FIG. 6, the integration period is controlled by the pulse width of the delay signal d, the exposure time of the system is controlled. The transfer time from pixel to pixel in FIG. 5B is effected by cycling the voltage on the three electrodes of each pixel from $V_{TH}$ to $V_{TL}$, to $V_{TL}$. $V_{TH}$ and $V_{TL}$ represent the high transfer and low transfer voltages. By cycling the voltage, the charge is dumped across from pixel to pixel into a floating gate output amplifier and buffer circuitry, which is not shown. FIG. 5C shows the photon generated charge integration capability during the two fields of a frame.

Figure 3:
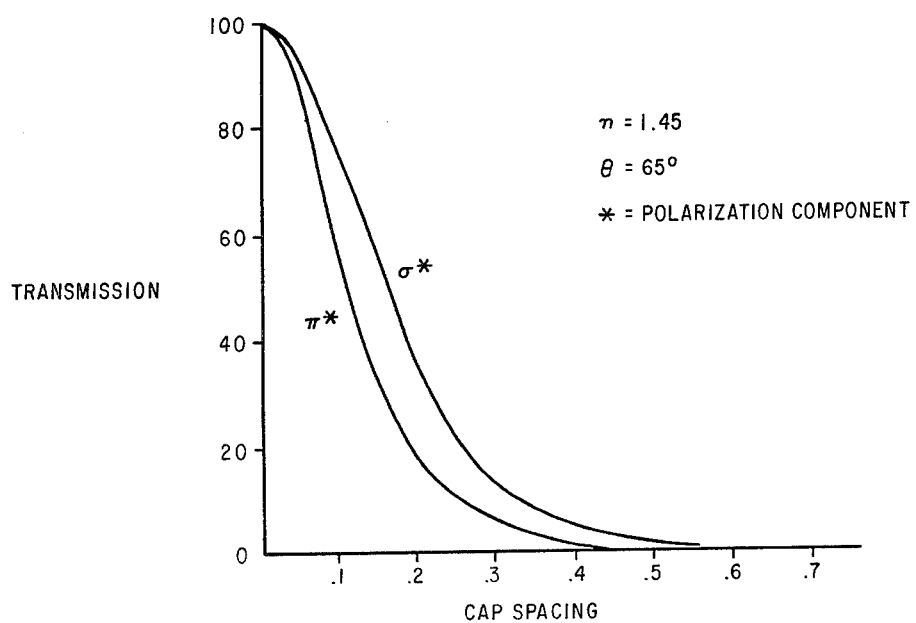
FIG. 3 is a graph of a typical FTIR transmission versus gap spacing response.

The typical response of a CCD camera limits the maximum usable wavelength to about 1.0 micrometers. From FIG. 3, the movement needed to change from the on state to the off state of an FTIR device is on the order of a 1 micrometer wavelength. Hence, the device requires very small movement to produce large changes in optical density for the standard wavelengths of a CCD. The small movement is obtained with the use of piezoelectric actuator. This type of actuator can give movement of this magnitude with very fast response times for reasonable load conditions. There is a very rigid structural integrity for these actuators which minimizes error due to vibration.

Figure 2:
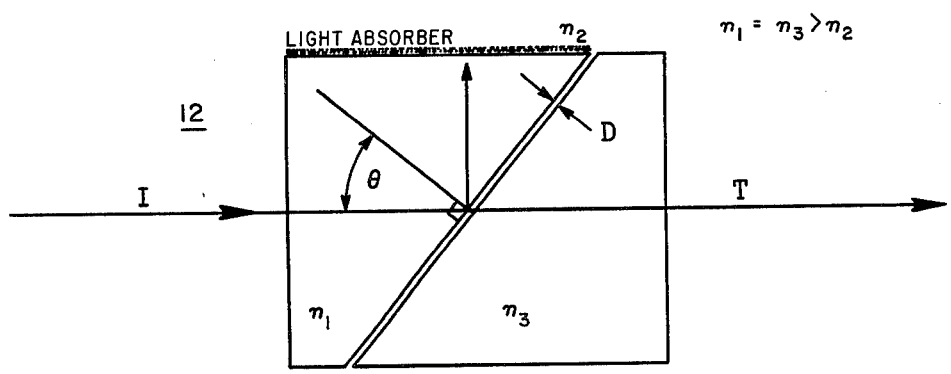
FIG. 2 shows a side view of an FTIR device.
Figure 7:
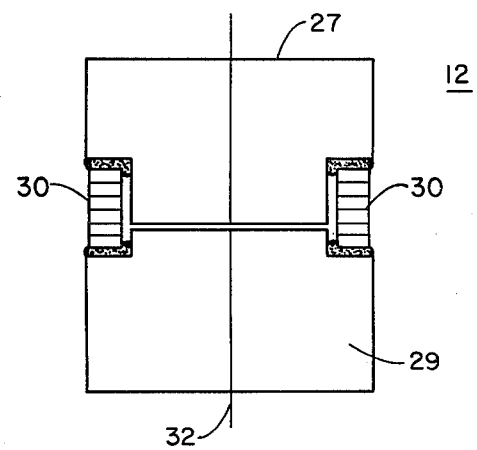
FIG. 7 shows a cross section of the internal mounting of transducer stacks to FTIR prisms.

FIG. 7 shows a side view of a FTIR device using two transducer stacks 30. As described previously, FTIR device 12 is composed of two prisms 27 and 29. The prisms are held a space D apart by two transducer stacks 30. Optical axis 32 is shown to understand the orientation of the device. The side view of FTIR prism combination is previously shown in FIG. 2. The two piezoelectric stacks 30 serve as actuators. A piezoelectric stack is a stack of piezoelectric actuators arranged in series but electrically connected in parallel. This provides relatively large movement with small changes in voltage for lower voltage operation. Such devices are capable of delivering extinction ratios on the order of 100:1, on state transmittance of 80–90%, and response times of 0.3 milliseconds turn on and 0.1 milliseconds turn off.

Figure 8:
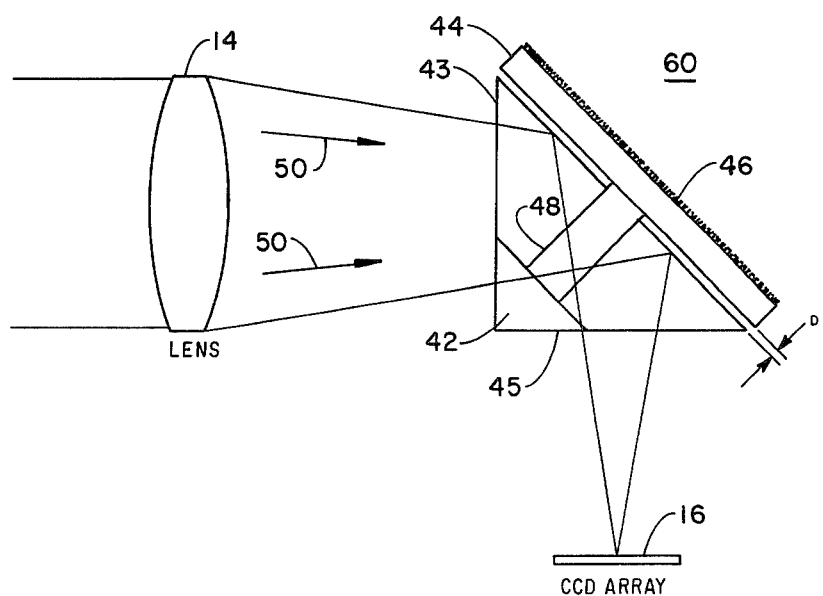
FIG. 8 is a side view of a reflection mode FTIR device.

FIG. 8 illustrates an implementation using a reflection mode FTIR device. The reflection mode device is more desirable where good on-state transmittance is very important. This requirement is common for CCD camera systems designed to be used as seekers. In the reflection mode, only one prism is required. The reflection mode can be made by using a lens 14, as shown previously, in combination with a single prism 42. Placed behind the triangular shape of prism 42 is an optical flat 44 of the same material as the prism. On the back of optical flat 44 is a light absorbing material 46. Light absorbing material 46 can be carbon black or any other high absorption material. Separating FTIR prism 42 from optical flat 44 are two piezoelectric stack actuators 48. In the side view shown in FIG. 8, only one stack actuator 48 is shown. Once again a spacing D between prism 42 and optical flat 44 is controlled by stack actuator 48. In the reflection mode, light passing through lens 14 travels as shown by arrows 50 and is reflected on the back surface of prism 42 onto CCD array 16. When the space d is made very small, high coupling permits almost all of incident light 50 to be transmitted through optical flat 44 where it is absorbed by light absorber 46. The on-state transmittance is controlled by the total internal reflection of the prism, which can be 100%. Significant factors in controlling the transmittance include the losses that occur at the entrance and exit surfaces of the prism. These surfaces, 43 and 45 can be anti-reflection coated to limit losses to 1% per surface. The off-state transmittance will be controlled according to the equation $$R_{min} = 1 - T_{(\sigma\pi)max} \qquad \text{EQ. 4}$$

where $R_{min}$ is the minimum reflectance possible and the remaining term is as described previously. If optical flat 44 and prism 42 are allowed to come into very close proximity, $T_{(\sigma\pi)max}$ is close to 100%. Hence, $R_{min}$ can be very small. $R_{min}$ theoretically becomes 0 if the prism and flat are allowed to come into contact. Since the two surfaces are optically flat, if intimate contact is allowed, the surfaces wring together with quite strong cohesive forces. These forces would hamper the rapid opening and closing of the device and thus the switching speed. A tradeoff has to be made between switching speed and off-state transmittance. This tradeoff is discretionary in terms of reaction speed versus effectiveness of light cutoff.

The reflection mode FTIR device used in FIG. 8 along with good on-state transmittance, provides better switching speed than the transmission mode device since the mass to be moved, optical flat 44, is lower than that of a comparable prism. The reflection mode device can also be arranged in tandem to increase the dynamic range by approximately the square of the value of one device as shown in FIG. 9A and FIG. 9B. The configurations shown in FIGS. 9A and 9B relieve some of the severity of the lens design and allow for the use of a telephoto len system as shown by lens combinations 52 and 54. There is no preferred arrangement or advantage to be gained by the orientation of the two reflection mode FTIR devices 60 and 62 shown in FIG. 9A and FIG. 9B.

The FTIR device does not provide uniform extinction with respect to wavelength or angle of incidence. Equation 3 reveals that the transmittance $T_{(\sigma\pi)}$ is heavily dependent on the wavelength, $\lambda$, and the angle of incidence, $\theta$. For this application, the expected optical bandwidth is from 0.35 micrometers to 1 micrometer and the incident angle may vary $\pm 3°$ with respect to the optical axis. If the device were to operate in the continuously variable mode, light of different angles would have different transmittance. This results in non-uniform radiance across the detector array. Light of different wavelengths also has different transmittance, and complex non-uniform rays arise from these two sources. Conversely, when the pulse code modulated mode is used, the distance d can be varied such that the device is off for all angles and wavelengths. Pulse code modulated mode is defined as modulation of light in such a way as the light is either full off or full on. The amount of light allowed to pass is a function of the on-time pulse width. This pulse width is controlled or modulated. Thus it can be seen that the device can be quickly switched through the non-uniform region to the fully on state. With the exception of the short transition period, the nonuniform region of the devices are avoided.

The preferred approach for the CCD seeker application incorporates the FTIR device purely as a blanking mechanism during the transfer period. This approach is chosen to simplify the design of the FTIR device and its drive circuitry to constant frequency and constant pulse width. The problem of interference from coupling of the modulated $V_{\phi VAH}$ signal with the output video can be severe. In this case, the following alternate approach is used. The FTIR device can be on-time pulse width modulated. In this mode, the integration time, T, of FIG. 10 is controlled by the pulse width of the FTIR device. As before, the device is always off during the field transfer period.

Most TV trackers take advantage of the inherent algorithm of background smear. This occurs because the motion relative to the TV imager of a target being tracked is less than the motion of the background when integrated over a field period. This results in a smearing effect of the background relative to the target and causes target enhancement. The approach discussed herein for sensitivity control makes it apparent that during high irradiance operation, when the exposure time is short, this inherent algorithm will be degraded. This effect can be regained for the algorithm as follows: a double sampling or double integration technique permits the overall integration time to be less than the predetermined time interval. FIG. 11 illustrates this approach. The assumption is made that the FTIR device can switch fast enough to generate two short integration periods in a field time. When this occurs, the target with small relative motion, will be essentially in the same location during both integration periods while the background will have moved. The result will be that the target edges will be sharp while background edges will be smeared. This technique will not work with modulation of the $V_{\phi VAH}$. This is due to the photon generated charge integrated during $T_1$ being recombined during the non-integration period between $T_1$ and $T_2$. Hence, only charge generated during $T_2$ will contribute to the signal.

Figure 12:
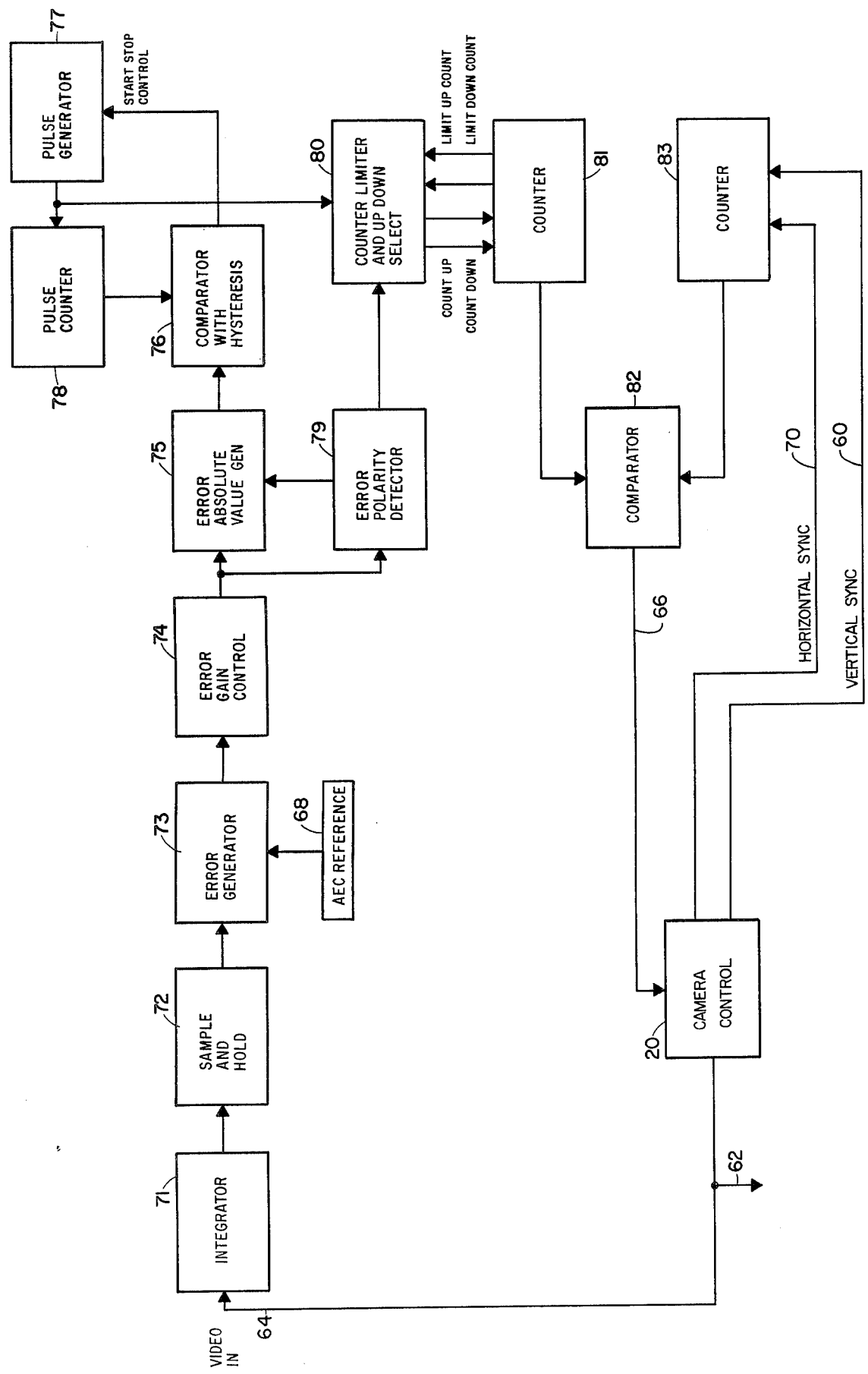
FIG. 12 is a block diagram of an automatic exposure control for use with the FIG. 4 configuration.

FIG. 12 is a block diagram for a circuit that replaces light level error signal generator 24 and voltage to pulse width converter 22 in FIG. 4. The vertical synchronization signal 60 comes from camera control 20 shown in FIG. 4. The video input signal 64 and video output signal 62 are identical and come from camera control 20. Output 66 in FIG. 12 is the identical output shown as arrow 66 in FIG. 4 from voltage to pulse converter 22. AEC reference 68 is an automatic error control set by a manual potential setting.

Figure 13:
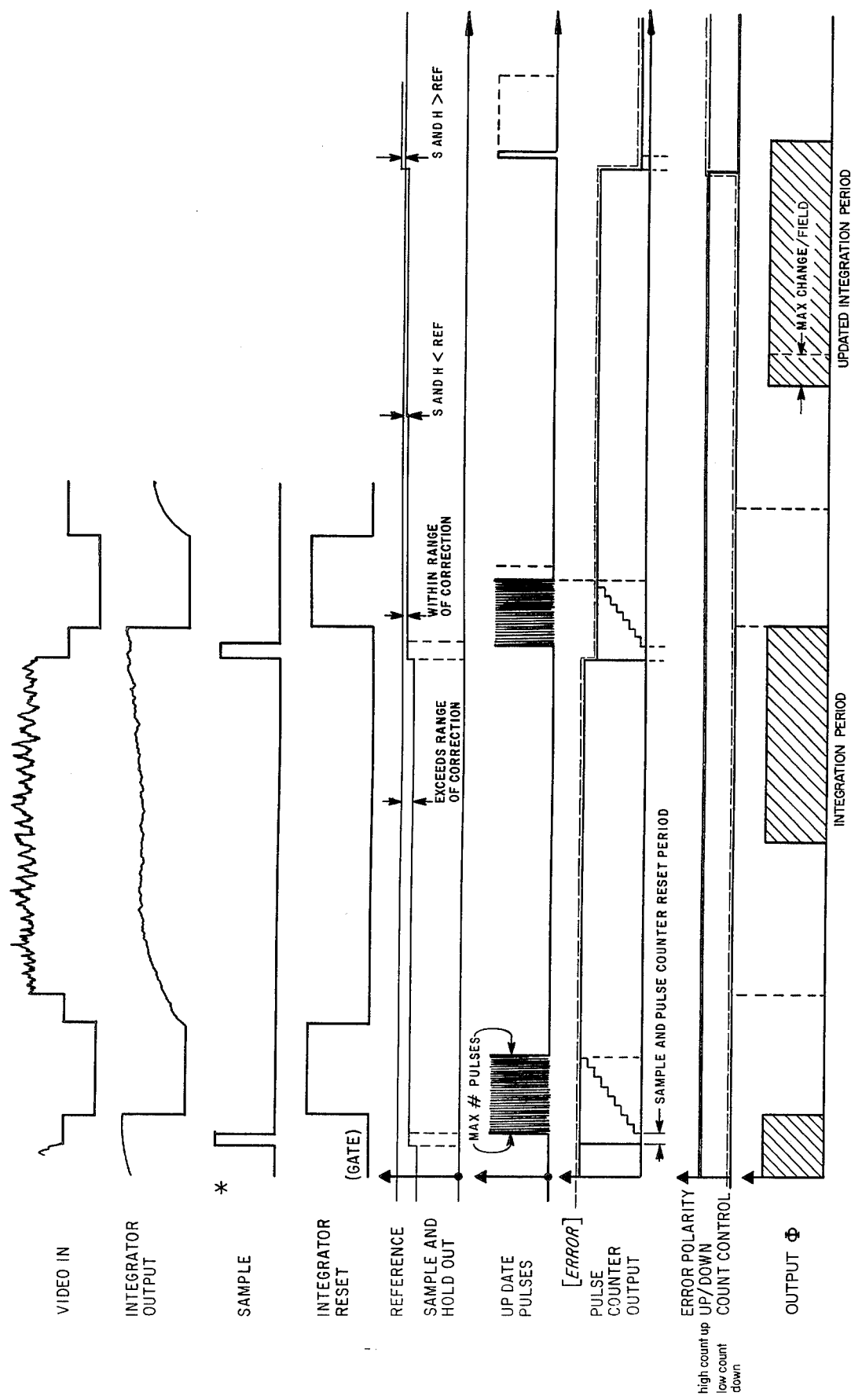
FIG. 13 is a waveform diagram for FIG. 12.

The net effect of the FIG. 12 circuit is to generate the waveform shown in FIG. 6. FIG. 13 shows the various relationships between the different electronic signals. The pulse counter output matches the number of update pulses which count up or down to the error signal, heavy dashed line. The error polarity, solid line, and count control, dashed line, will be opposite yes/no states.

Figure 14:
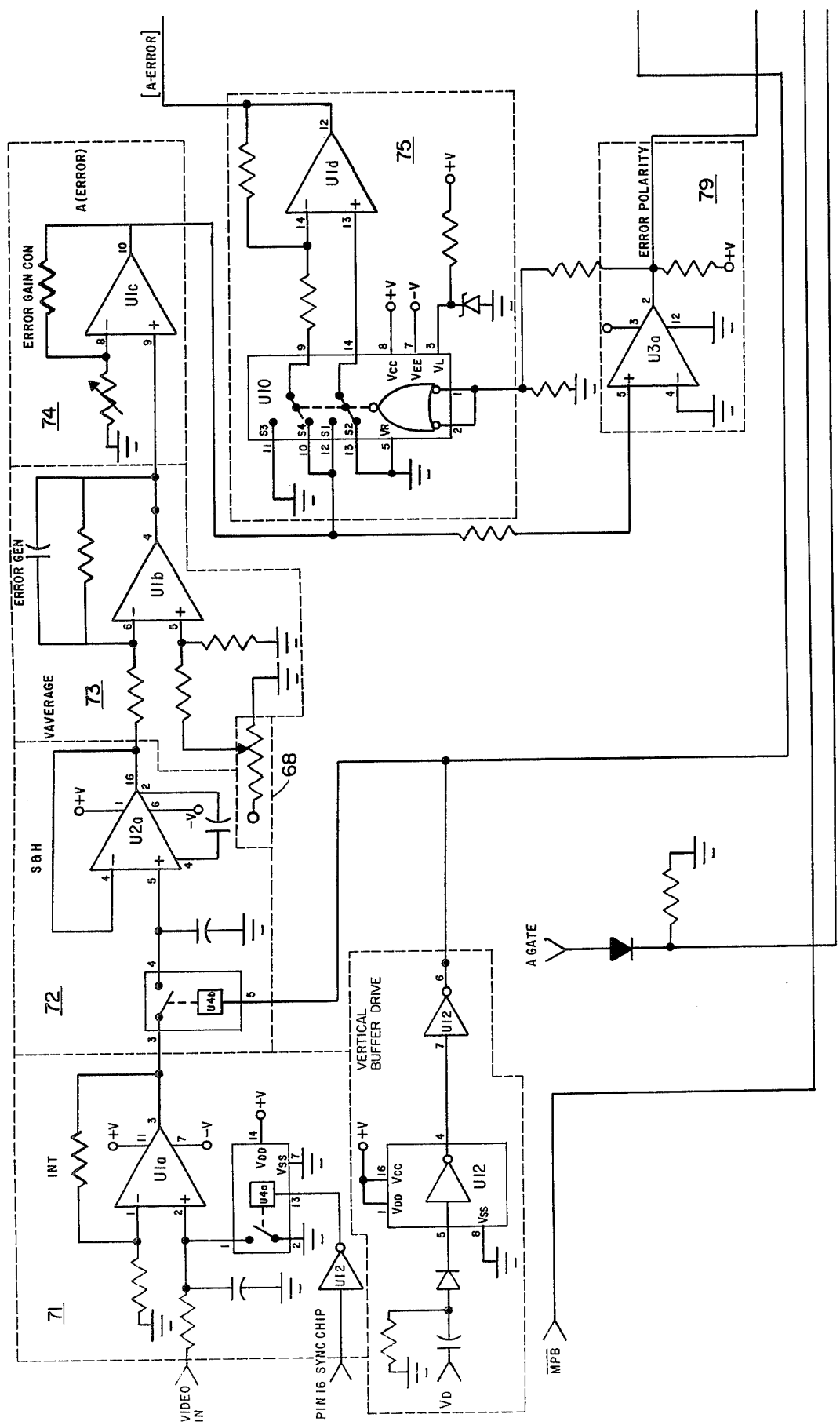
FIG. 14 is a circuit diagram for FIG. 12.
Figure 14:
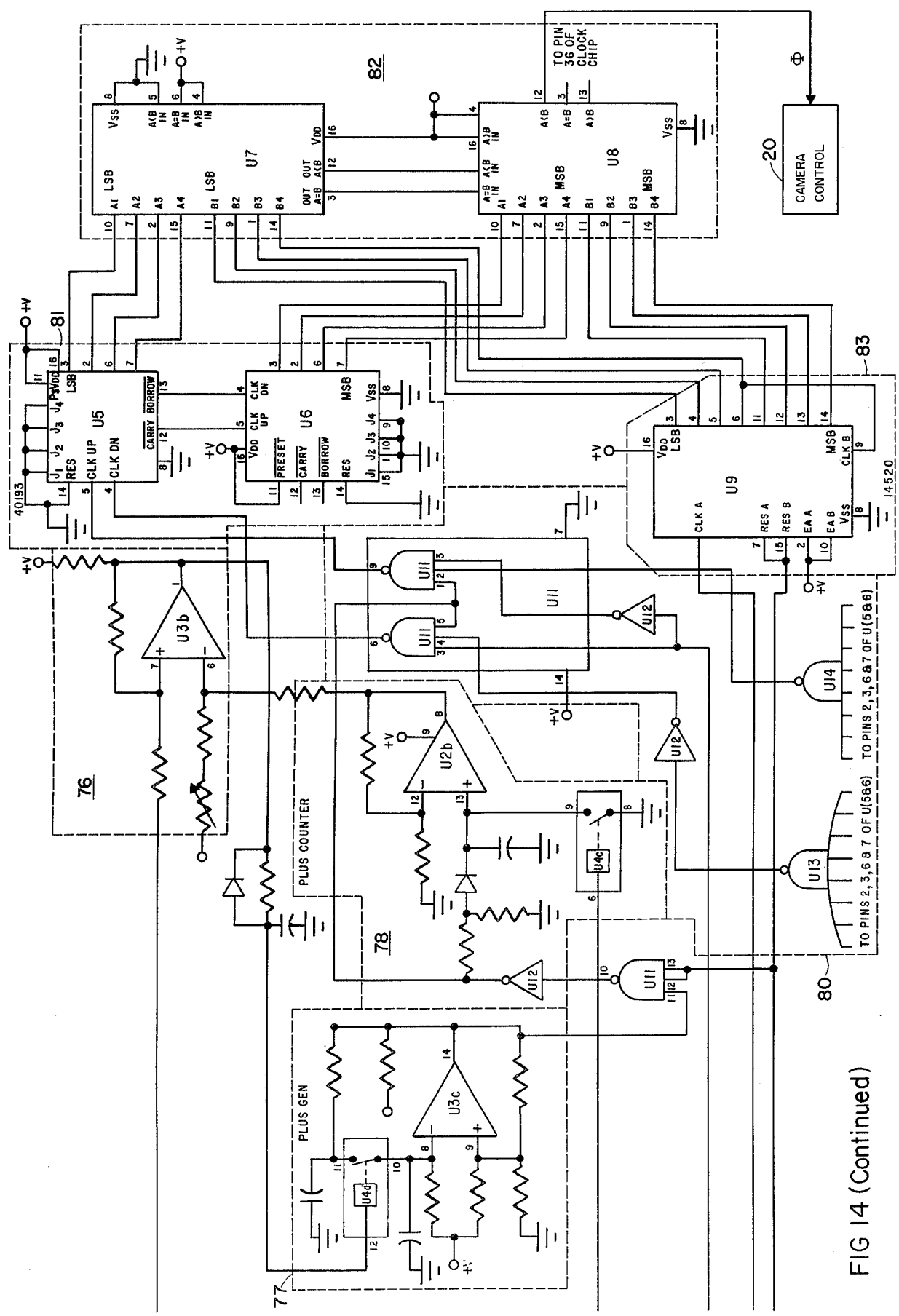

FIG. 14 is a circuit diagram of FIG. 12. The components within the dotted lines refer to the appropriate blocks 71 through 83 of FIG. 12.

It is clear to those skilled in the art that numerous modifications on the above device may be made.

What is claimed is:

1. A charge coupled device camera with integration control of incident light along an optical path comprising:
    a lens in the path of said incident light;
    a two dimensional charge coupled device, CCD, placed in the path of said incident light after it has passed through said lens;
    a frustrated total internal reflection, FTIR, device placed between said lens and said CCD in said optical path;
    means for controlling said FTIR device connected to said FTIR device;
    camera control circuitry connected to said CCD;
    a light level error signal generator connected to said camera control circuitry; and
    a voltage to pulsewidth converter connected between said camera control circuitry and and said FTIR control means and said light level error signal generator.

2. A charge coupled device camera with integration control of incident light along an optical path as claimed in claim 1 where said light level error signal generator and voltage to pulsewidth converter comprise:
    an integrator circuit connected to said camera control circuitry;
    a sample and hold circuit connected in series to said integrator;
    an error generator with a predetermined threshold connected in series to said sample and hold circuit;
    an error gain control circuit connected in series to said error generator;
    an absolute value generator connected to said error gain control circuit;
    an error polarity detector connected to input from said error gain control circuit and to have two outputs, one of said outputs input to said absolute value generator;
    a comparator connected to said absolute value generator;
    a pulse generator connected to said comparator;
    a pulse counter connected to provide feedback to said comparators from said pulse generator;
    a counter limiter inputting said second output from said error polarity detector and also inputting the same signal fed to said pulse counter by said pulse generator;
    a first counter operatively connected to said counter limiter;
    a second counter inputting horizontal sync and vertical sync from said camera control circuitry; and
    a comparator inputting signals from both of said counters and feeding an output signal to said camera control circuitry.

* * * * *